United States Patent
Fredkin

(10) Patent No.: US 10,257,112 B1
(45) Date of Patent: Apr. 9, 2019

(54) COMPUTER SYSTEM MAKING BANDWIDTH-EFFICIENT USE OF INTERNET RESOURCES

(71) Applicant: Edward Fredkin, Brookline, MA (US)

(72) Inventor: Edward Fredkin, Brookline, MA (US)

( * ) Notice: Subject to any disclaimer, the term of this patent is extended or adjusted under 35 U.S.C. 154(b) by 130 days.

(21) Appl. No.: 14/934,486

(22) Filed: Nov. 6, 2015

Related U.S. Application Data

(60) Provisional application No. 62/076,928, filed on Nov. 7, 2014.

(51) Int. Cl.
*H04L 12/911* (2013.01)
*H04L 12/24* (2006.01)

(52) U.S. Cl.
CPC ........ *H04L 47/783* (2013.01); *H04L 41/0896* (2013.01)

(58) Field of Classification Search
None
See application file for complete search history.

(56) References Cited

U.S. PATENT DOCUMENTS

| | | | | |
|---|---|---|---|---|
| 5,870,769 | A * | 2/1999 | Freund ................... | H04L 29/06 709/218 |
| 5,996,007 | A * | 11/1999 | Klug ...................... | H04L 29/06 709/218 |
| 6,067,565 | A * | 5/2000 | Horvitz .................. | H04L 29/06 709/223 |
| 6,085,226 | A * | 7/2000 | Horvitz ............. | G06F 17/30902 709/203 |
| 6,182,133 | B1 * | 1/2001 | Horvitz ............. | G06F 17/30902 709/219 |
| 6,236,661 | B1 * | 5/2001 | Ballard ................... | H04L 29/06 370/410 |
| 6,341,304 | B1 | 1/2002 | Engbersen et al. | |
| 6,385,641 | B1 | 5/2002 | Jiang et al. | |
| 6,457,047 | B1 * | 9/2002 | Chandra ........... | G06F 17/30902 709/217 |

(Continued)

OTHER PUBLICATIONS

Brin et al., *The Anatomy of a Large-Scale Hypertextual Web Search Engine*, http://infolab.stanford.edul~backrub/googie.html, Seventh International World-Wide Web Conference (WWW1998), Apr. 14-18, 1998, Brisbane, Australia, 16 pages.

*Primary Examiner* — Jeffrey R Swearingen
(74) *Attorney, Agent, or Firm* — Sunstein Kann Murphy & Timbers LLP

(57) ABSTRACT

A computer system, configured for bandwidth-efficient use of internet resource has a storage system, in which are stored: (i) web data selected for storage based on (a) frequency of occurrence in downloads from the World Wide Web as determined with reference to a relevant population of users over a relevant period of time or (b) relative importance to the relevant population of users over the relevant period of time; and (ii) instructions that establish a local-reference computer process, running within a web browser computer process, which, responsive to a URL entered into a browser established by the web browser computer process, first accesses the storage system to determine whether web data corresponding to the entered URL is stored in the storage system, and, if so, causes the corresponding web data to be retrieved locally from the storage system and displayed in the browser.

11 Claims, 3 Drawing Sheets

(56) References Cited

U.S. PATENT DOCUMENTS

| | | | |
|---|---|---|---|
| 6,532,490 B1 * | 3/2003 | Lewis | H04L 69/329 709/217 |
| 7,203,731 B1 * | 4/2007 | Coates | H04L 29/06 709/214 |
| 9,002,826 B2 | 4/2015 | Rabii | |
| 2003/0172134 A1 | 9/2003 | Zervas et al. | |

* cited by examiner

COMPUTER SYSTEM MAKING BANDWIDTH-EFFICIENT USE OF INTERNET RESOURCES

RELATED APPLICATION

This application claims the benefit of U.S. Provisional Application No. 62/076,928, filed on Nov. 7, 2014 and titled "Computer System Making Bandwidth-Efficient Use of Internet Resources," the entire disclosure of which is hereby incorporated herein by reference.

TECHNICAL FIELD

The present invention relates to web caching systems, and more particularly to systems using massive local caching of data.

SUMMARY OF THE EMBODIMENTS

In a first embodiment of the invention there is provided a computer system, configured for bandwidth-efficient use of internet resources. The computer system includes a processor; random access memory, coupled to the processor; and a non-transitory storage system, coupled to the processor. In the storage system are stored:

(i) web data, such web data consuming at least approximately 0.5 terabytes of capacity of the storage system, the storage system coupled locally to the processor, the data selected for storage based on criteria that include at least one member selected from the group consisting of (a) frequency of occurrence in downloads from the World Wide Web as determined with reference to a relevant population of users over a relevant period of time and (b) relative importance to the relevant population of users over the relevant period of time; and (ii) instructions that establish a local-reference computer process running within a web browser computer process, executing on the processor, wherein the local-reference process, responsive to a URL is entered into a browser established by the web browser computer process, first accesses the storage system to determine whether web data corresponding to the entered URL is stored in the storage system, and, if so, causes the corresponding web data to be retrieved locally from the storage system and displayed in the browser.

In a related embodiment, in the non-transitory storage system there are additionally stored: (iii) instructions that establish a search engine process, running within the web browser process, and (iv) an index of the web data stored in storage system. In this embodiment, the search engine process is configured, when the search engine process is accessed via the browser, to utilize the index to provide local search results that are available locally in the web data stored in the storage system. Optionally, the search engine process is further configured to cause accessing of a web-based search engine to provide further search results that are available via the World Wide Web when the computer system is coupled to the Internet. As a further option, the further search results are segregated from the local search results, so that a user can select whether to access local search results or to access results over the World Wide Web.

In another related embodiment, such web data consumes at least approximately 1 terabyte of capacity of the storage system. Optionally, in the non-transitory storage system there are additionally stored data tables for use in speeding computer-based calculations and wherein the data tables consume at least approximately 0.5 terabytes of capacity of the storage system.

In another related embodiment, less than half of the capacity of the storage system consumed by web data is consumed by pictorial data. In a further related embodiment, less than one-quarter of the capacity of the storage system consumed by web data is consumed by pictorial data.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

Figure 1:
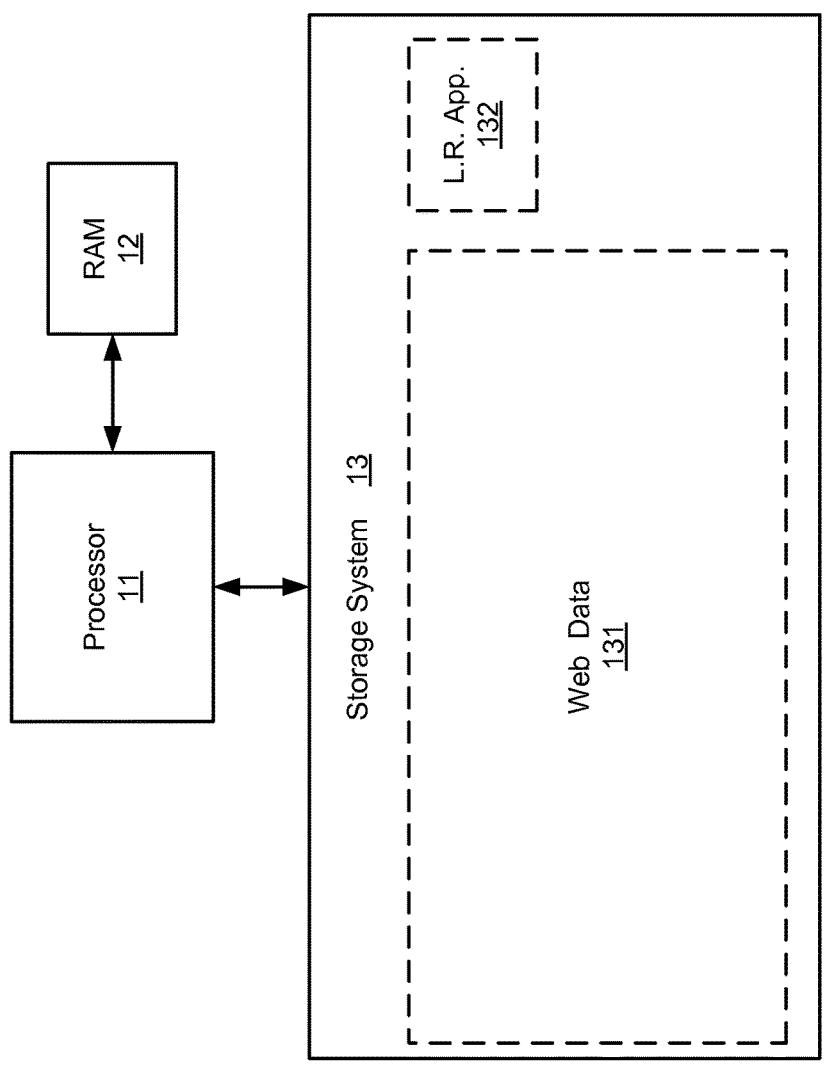
FIG. 1 is a block diagram of a computer system in accordance with an embodiment of the present invention providing a bandwidth efficient use of internet resources.

As used in this description and the accompanying claims, the following terms shall have the meanings indicated, unless the context otherwise requires:

"Web data" are data downloadable from the World Wide Web using URLs, such data including the URLs pertinent thereto. Although the data may be in the form of web pages, the web pages may in turn embed files in any of a wide range of formats.

A "URL" is a Uniform Resource Locator.

A "non-transitory storage system" is a set of storage devices that permanently store digital data, and the devices may be include, by way of example, but are not limited to, one or more disk drives, solid state disks (SSDs), EPROMs, EEPROMs, CDs, DVDs, flash memory, and combinations of these devices.

A "web browser computer process" executing on a processor in a computer system establishes a web browser running on the computer system.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

"Pictorial data" include any video data and any image data.

A "set" includes at least one member.

In many situations, access to the cornucopia of data available on the World Wide Web is constrained (as well as uploading of data to the World Wide Web) by bandwidth, intermittent communication, expense, power requirements, legal considerations, etc., such as on an airplane, or ship or bus or train (collectively a "transport system") or in various remote locations.

Embodiments of the present invention address this problem by providing a massive local cache of web data, for example, of the order of 1 or 2 terabytes (TB). Such an amount of data is now feasible to be stored locally and, using techniques described herein, to be provisioned to a computer system.

The challenges of provisioning this quantity of data can be envisioned in this example. If the cache stores 1 TB of data, to downloading 1 TB of data, assuming a fast Internet connection speed of 20 megabits per second available to a consumer, would correspond to 2.5 megabytes per second, or 150 megabytes per minute, and therefore 9 GB per hour or 216 GB per day. Downloading 1 TB of data would therefore require about 5 days.

On the other hand, once the web data is provisioned locally, many kinds of searches on the World Wide Web can be performed locally.

FIG. 1 is a block diagram of a computer system in accordance with an embodiment of the present invention providing a bandwidth efficient use of internet resources. The computer system includes a processor 11, coupled to a RAM 12, and to a storage system 13. In the storage system are web data 131 and a local-reference application 132 that, when executed on the processor 11, establishes a local-reference computer process running within a web browser process running in the computer system. The web data 131 are selected for storage based on criteria that include at least one member selected from the group consisting of (a) frequency of occurrence in downloads from the World Wide Web as determined with reference to a relevant population of users over a relevant period of time and (b) relative importance to the relevant population of users over the relevant period of time. In the case of frequency of occurrence in downloads, a system, such as Google's PageRank system may be employed. See, for example, Sergey Brin and Lawrence Page, "The Anatomy of a Large-Scale Hypertextual Web Search Engine", available on Nov. 7, 2014 at http://infolab.stanford.edu/~backrub/google.html, which is hereby incorporated herein by reference.

Figure 2:
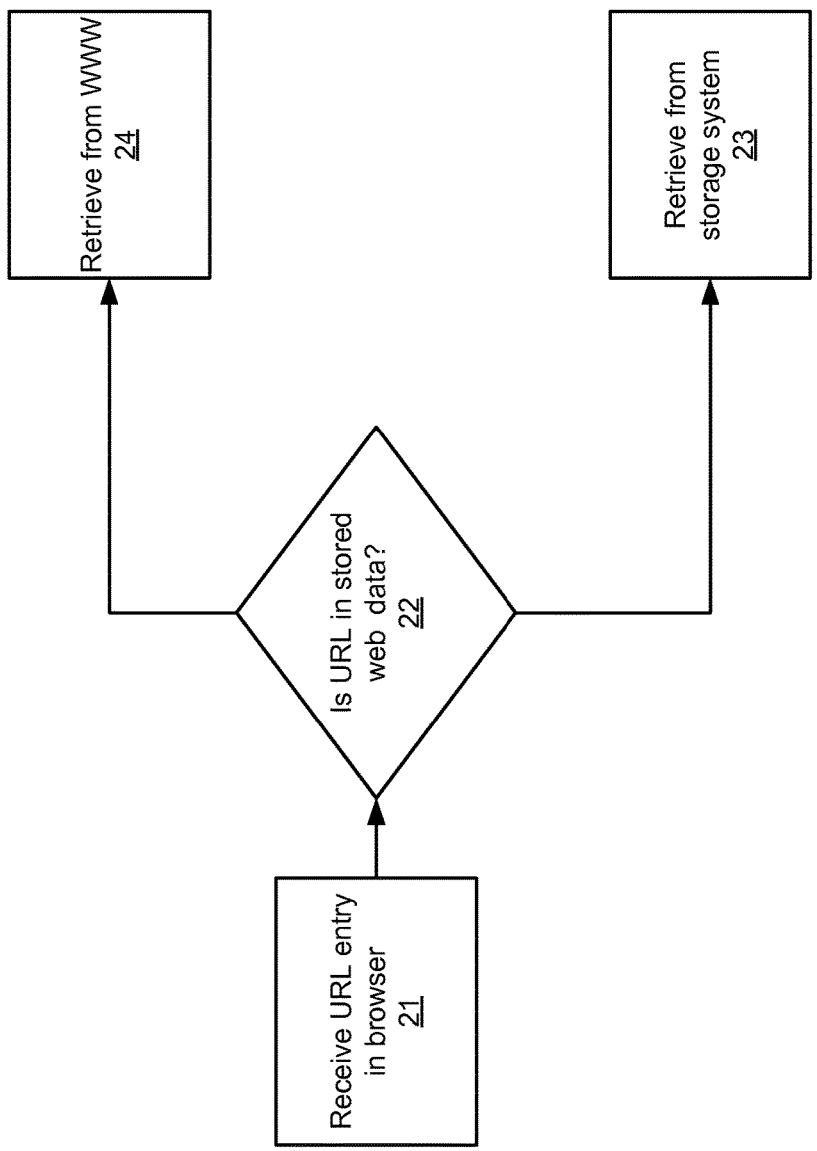
FIG. 2 is a block diagram of logical processes carried out by a local-reference computer process running within a web browser computer process, executing on the processor 11 of FIG. 1, in accordance with an embodiment of the present invention.

FIG. 2 is a block diagram of logical computer processes carried out by the local-reference computer process running within a web browser computer process, executing on the processor 11 of FIG. 1, in accordance with an embodiment of the present invention. In process 21, a URL entry made in the browser is received. In process 22, it is determined whether the URL is in the web data that are stored in the storage system. If the URL is in the storage system, then in process 23 the local-reference computer process retrieves the web page from the storage system for display by the browser process. If the URL is not in the storage system, then in process 24 the local-reference computer process retrieves the web page from the World Wide Web. A sufficiently well selected store of web data will enable many URLs entered into the browser to be satisfied by access locally of the web data from the storage system.

Figure 3:
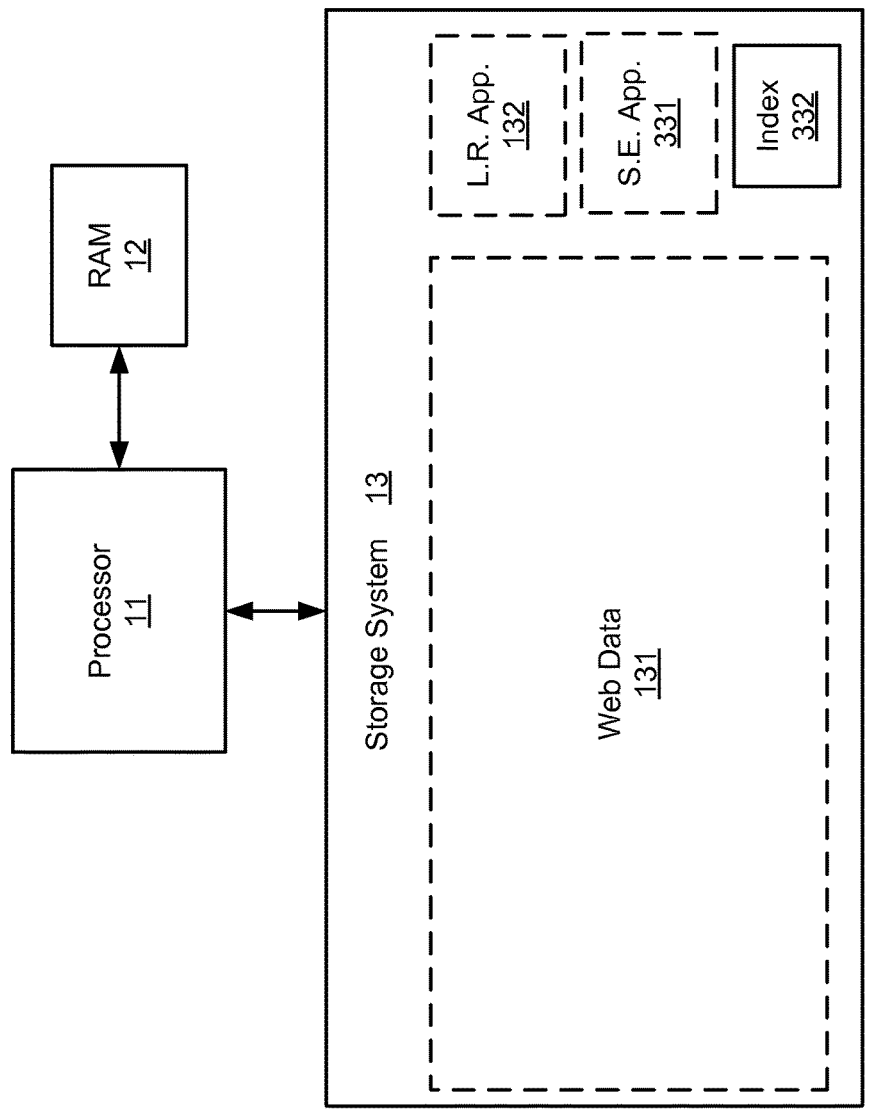
FIG. 3 is a block diagram of a computer system in accordance with further embodiment of the present invention, in which the computer system provisioned with a local search engine application.

FIG. 3 is a block diagram of a computer system in accordance with further embodiment of the present invention, in which the computer system provisioned with a local search engine application. In this embodiment, there are provided, as in the case of FIG. 1 the processor 11, the RAM 12, and the storage system 13, including a massive cache of web data 131, as well as the local-reference application 132. Additionally, there are stored in the storage system a search engine application 331 and an index 332 to the web data. In this embodiment, the search engine application, when executing on the processor 11, establishes a search engine process, and the search engine process is configured, when the search engine process is accessed via the browser, to utilize the index to provide local search results that are available locally in the web data stored in the storage system. In a further embodiment, the search engine process is further configured to cause accessing of a web-based search engine, such as Google, the search engine available at www.google.com, to provide further search results that are available via the World Wide Web when the computer system is coupled to the Internet. In a further embodiment, the further search results are segregated from the local search results, so that a user can select whether to access local search results or to access results over the World Wide Web.

Provisioning of the storage system 13 with the web data in one embodiment is achieved at a time when the storage system is manufactured. In such a case, a large number, for example, one hundred, or one thousand, of storage systems will be co-located. A variety of techniques can be used to populate the systems with the (for example) 1 TB of data. For example, the collocated storage systems can be coupled to controller-driven data stores that can transfer the 1 TB of data to each of the collocated storage systems in a massively parallel fashion.

In implementing these embodiments, the content of storage system 13 can be enhanced by propitious timing of data uploads. For example, assume that the web data 131 in storage system 13 is current to a given time $T_1$. At time $T_2$, just before departure of the transport system, the web data 131 in storage system 13 can be updated with new web data that reflects content that has arisen or changed between times $T_2$ and $T_1$. Updating of the storage system 13 can be accomplished, for example, by using one or more USB-based memory devices, such as thumb drives. Besides updating the storage system 13 using discrete memory devices, such as thumb drives, in periods when the transport system intermittently encounters high-bandwidth World Wide Web communication capability, the storage system can be updated automatically using that high bandwidth capability.

In some situations, after an update to the web data 131, the local reference application 132 may determine that data previously served to a user has been updated; in such a case, in a further embodiment of the present invention, the local reference application 132 will serve the updated data to the user. In this respect, the storage system 13 may be viewed as a large data buffer, and in some contexts, as, for example, stock quote data, it may be important for the user to know the age of the data. This need can be satisfied by providing a time stamp with data that is served to the user.

Since passengers on a transport system can have needs to send data as well as to receive it over the World Wide Web, data uploads from passengers on the transport system can also be stored with web data 131 in storage system 13. At any point when the web data 131 are updated as described in previous paragraphs, either by using discrete memory devices or automatically, then in a further related embodiment, the accumulated passenger-upload data are transferred from the storage system 13 to the World Wide Web.

It can be seen that embodiments of the present invention are applicable to environments when communication with the World Wide Web is non-existent and environments with communication with the World Wide Web is heavily constrained. In the latter case, a benefit of embodiments hereof is efficient use of the available communication capability, since the embodiments can avoid the necessity of retrieving from the World Wide Web any data that is already locally available—and the embodiments are designed so that most data falls into that category.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of providing access to the World Wide Web in an environment, selected from the group consisting of a transport system and a remote location, wherein such access is constrained, the method comprising:

providing, for use in the environment, a computer system including:
- a processor;
- random access memory, locally coupled to the processor;
- a non-transitory storage system, locally coupled to the processor, in which are stored:
  - (i) web data, current in the storage system at a given time $T_1$, such web data consuming at least approximately 0.5 terabytes of capacity of the storage system, the data selected for storage based on use criteria that include at least one member selected from the group consisting of (a) frequency of occurrence in downloads from the World Wide Web as determined with reference to a relevant population of users over a relevant period of time and (b) relative importance to the relevant population of users over the relevant period of time; and
  - (ii) instructions that establish a local-reference computer process executing on the processor, wherein the local-reference process, responsive to a URL entered into a browser, first accesses the storage system to determine whether web data corresponding to the entered URL is stored in the storage system, and, if so, causes the corresponding web data to be retrieved locally from the storage system and transmitted to the browser;
- so that the system achieves bandwidth-efficient use of internet resources by avoidance of use of internet resources for retrieval of any web data, corresponding to the entered URL, that is stored in the storage system, and this avoidance is achieved according to the use criteria; and updating the web data in the storage system in bulk at a scheduled time $T_2$, wherein $T_2$ occurs after $T_1$, to reflect content that has arisen or changed between times $T_2$ and $T_1$.

2. A method according to claim 1, wherein in the non-transitory storage system there are additionally stored:
   (iii) instructions that establish a search engine process, running within the web browser process, and
   (iv) an index of the web data stored in storage system, wherein the search engine process is configured, when the search engine process is accessed via the browser, to utilize the index to provide local search results that are available locally in the web data stored in the storage system.

3. A method according to claim 2, wherein the search engine process is further configured to cause accessing of a web-based search engine to provide further search results that are available via the World Wide Web when the computer system is coupled to the Internet.

4. A method according to claim 3, wherein the further search results are segregated from the local search results, so that a user can select whether to access local search results or to access results over the World Wide Web.

5. A method according to claim 1, wherein such web data consume at least approximately 1 terabyte of capacity of the storage system.

6. A method according to claim 1, wherein in the non-transitory storage system there are additionally stored data tables for use in speeding computer-based calculations and wherein the data tables consume at least approximately 0.5 terabytes of capacity of the storage system.

7. A method according to claim 1, wherein less than half of the capacity of the storage system consumed by web data is consumed by pictorial data.

8. A method according to claim 1, wherein less than one-quarter of the capacity of the storage system consumed by web data is consumed by pictorial data.

9. A method according to claim 1, further comprising:
   associating and storing with each item of the web data placed in the storage system at the times $T_1$ and $T_2$ a time stamp by which the age of such item of data can be determined; and
   with respect to an item of data served to a user between times $T_1$ and $T_2$, using the time stamp associated with the item of data thus served to determine after time $T_2$ if the item has been updated, and if so, then serving the updated item to the user.

10. A method according to claim 1, further comprising:
    between times $T_1$ and $T_2$, storing a set of data uploads, from a set of users of the computer system, with the web data in the storage system; and
    at time $T_2$, uploading the stored data uploads to the World Wide Web.

11. A method according to claim 1, wherein the non-transitory storage system has been populated with the web data in a data population process during which the non-transitory storage system was one of at least one hundred similar co-located storage systems coupled to controller-driven data stores configured to transfer the web data to the storage systems in a massively parallel fashion.

* * * * *